(12) United States Patent
Takizawa et al.

(10) Patent No.: US 11,550,172 B2
(45) Date of Patent: *Jan. 10, 2023

(54) REFLECTIVE SPATIAL LIGHT MODULATOR HAVING A PEROVSKITE-TYPE ELECTRO-OPTIC CRYSTAL, OPTICAL OBSERVATION DEVICE INCLUDING SAME, AND LIGHT IRRADIATION DEVICE INCLUDING SAME

(71) Applicant: HAMAMATSU PHOTONICS K.K., Hamamatsu (JP)

(72) Inventors: Kuniharu Takizawa, Hamamatsu (JP); Hiroshi Tanaka, Hamamatsu (JP); Haruyoshi Toyoda, Hamamatsu (JP); Yasushi Ohbayashi, Hamamatsu (JP); Hiroto Sakai, Hamamatsu (JP); Tsubasa Watanabe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 256 days.

This patent is subject to a terminal disclaimer.

(21) Appl. No.: 16/769,321

(22) PCT Filed: Dec. 5, 2017

(86) PCT No.: PCT/JP2017/043708
§ 371 (c)(1),
(2) Date: Jun. 3, 2020

(87) PCT Pub. No.: WO2019/111333
PCT Pub. Date: Jun. 13, 2019

(65) Prior Publication Data
US 2020/0292856 A1    Sep. 17, 2020

(51) Int. Cl.
*G01N 21/64* (2006.01)
*G02F 1/03* (2006.01)

(52) U.S. Cl.
CPC ....... *G02F 1/0327* (2013.01); *G01N 21/6458* (2013.01); *G01N 2021/6463* (2013.01); *G01N 2201/0675* (2013.01)

(58) Field of Classification Search
CPC ...... G02F 1/03; G02F 1/0558; G02F 2203/12; G02B 21/00; G01N 1/28; G01N 21/64; G01N 2021/6491
(Continued)

(56) References Cited

U.S. PATENT DOCUMENTS 3,838,906 A * 10/1974 Kumada ............... G02F 1/05
                                                              359/322
5,221,989 A    6/1993 Stappaerts et al.
(Continued)

FOREIGN PATENT DOCUMENTS

JP    2003-177370 A    6/2003
JP    2006-293022 A    10/2006
(Continued)

OTHER PUBLICATIONS

International Preliminary Report on Patentability dated Jun. 18, 2020 for PCT/JP2017/043708.
(Continued)

*Primary Examiner* — Que Tan Le
(74) *Attorney, Agent, or Firm* — Faeger Drinker Riddle & Reath LLP

(57) ABSTRACT

A reflective spatial light modulator includes an electro-optic crystal having an input surface to which input light is input and a rear surface opposing the input surface, a light input/output unit being disposed on the input surface of the electro-optic crystal and having a first electrode through which the input light is transmitted, a light reflection unit including a substrate including a plurality of second electrodes and an adhesive layer for fixing the substrate to the
(Continued)

rear surface and being disposed on the rear surface of the electro-optic crystal, and a drive circuit applying an electric field between the first electrode and the plurality of second electrodes.

14 Claims, 11 Drawing Sheets

(58) Field of Classification Search
USPC .................................................. 250/216, 239
See application file for complete search history.

(56) References Cited

U.S. PATENT DOCUMENTS

| | | |
|---|---|---|
| 5,497,258 A | 3/1996 | Ju et al. |
| 6,288,822 B2 | 9/2001 | Romanovsky |
| 6,486,996 B1 | 11/2002 | Romanovsky |
| 6,525,867 B1 | 2/2003 | Oakley et al. |
| 2011/0170160 A1 | 7/2011 | Park et al. |
| 2013/0057953 A1 | 3/2013 | Yokoi |
| 2020/0292856 A1 | 9/2020 | Takizawa et al. |
| 2020/0326564 A1 | 10/2020 | Takizawa et al. |

FOREIGN PATENT DOCUMENTS

| | | |
|---|---|---|
| JP | 2010-19630 A | 1/2010 |
| JP | 2010-026079 A | 2/2010 |
| JP | 2014-89340 A | 5/2014 |
| JP | 2014-89341 A | 5/2014 |
| JP | 2014-092612 A | 5/2014 |
| JP | 2014-219495 A | 11/2014 |
| JP | 2015-018175 A | 1/2015 |

OTHER PUBLICATIONS

U.S. Office Action dated Dec. 21, 2020 issued in U.S. Appl. No. 16/769,327, including double-patenting rejection based on U.S. Appl. No. 16/769,327 and U.S. Appl. No. 16/769,327.
International Preliminary Report on Patentability dated Jun. 18, 2020 for PCT/JP2017/043709.

* cited by examiner

Fig. 3
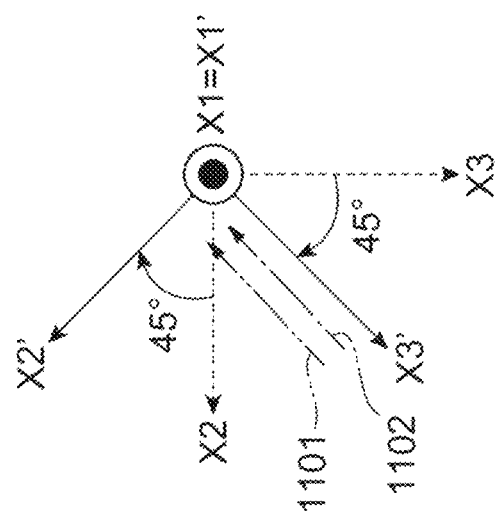
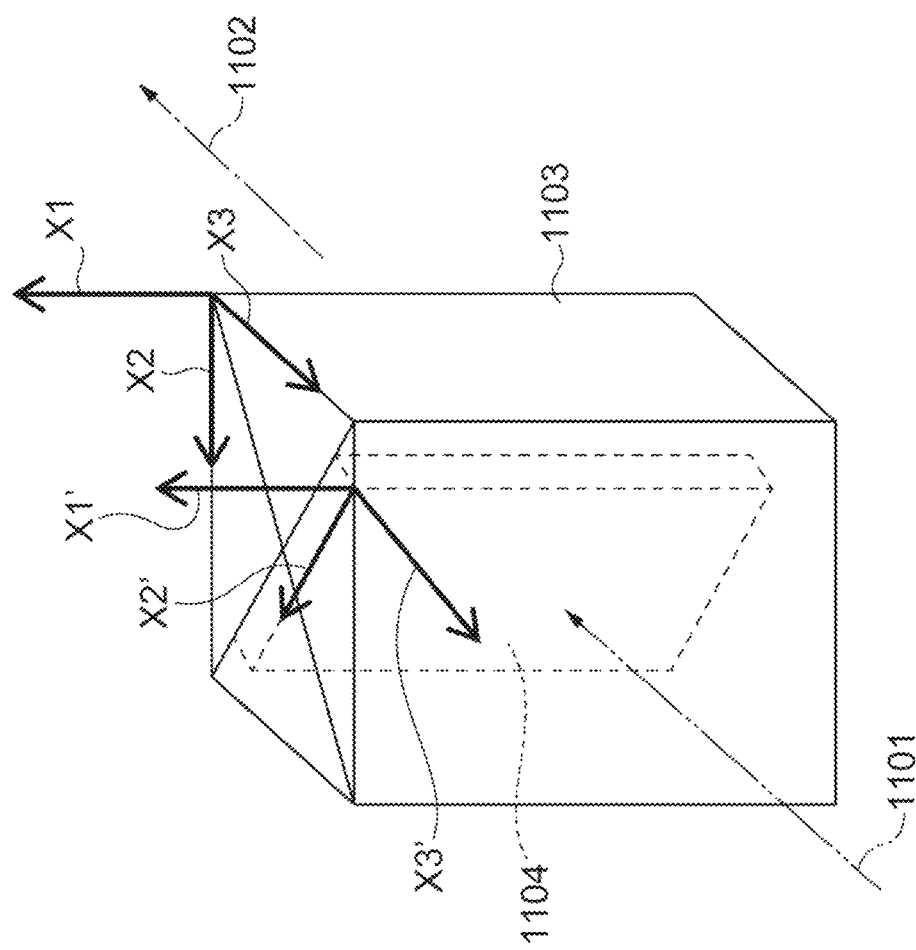

REFLECTIVE SPATIAL LIGHT MODULATOR HAVING A PEROVSKITE-TYPE ELECTRO-OPTIC CRYSTAL, OPTICAL OBSERVATION DEVICE INCLUDING SAME, AND LIGHT IRRADIATION DEVICE INCLUDING SAME

TECHNICAL FIELD

The present disclosure relates to a reflective spatial light modulator, an optical observation device, and a light irradiation device.

BACKGROUND ART

For example, Patent Literature 1 and Patent Literature 2 disclose electro-optical elements. These electro-optical elements include a substrate, a KTN ($KTa_{1-x}Nb_xO_3$) layer of a ferroelectric substance laminated on the substrate, a transparent electrode disposed on a front surface of the KTN layer, and a metal electrode disposed on a back surface of the KTN layer. KTN exhibits four crystal structures depending on a temperature and is utilized as an electro-optical element when it has a perovskite-type crystal structure. Such a KTN layer is formed on a seed layer which is formed on a metal electrode.

CITATION LIST

Patent Literature

[Patent Literature 1] Japanese Unexamined Patent Publication No. 2014-89340
[Patent Literature 2] Japanese Unexamined Patent Publication No. 2014-89341

SUMMARY OF INVENTION

Technical Problem

Patent Literature 1 and Patent Literature 2 disclose that conductivity is applied to a seed layer by adding a conductive substance to the seed layer. In this case, a metal electrode and a KTN layer are electrically connected to each other. Therefore, an electric field can be applied to the KTN layer. However, for example, if conductivity is applied to a seed layer when a plurality of metal electrodes of an electro-optical element are formed in an array shape, there is concern that electrical signals input to the plurality of metal electrodes may become mixed and the modulation accuracy may not become stable. In addition, it is required that the metal electrodes do not fall off from the KTN layer such that an electric field can be reliably applied to the KTN layer.

An object of an embodiment is to provide a reflective spatial light modulator, a light irradiation device, and an optical observation device, in which light modulation can be stably performed.

Solution to Problem

According to an aspect, there is provided a reflective spatial light modulator modulating input light and outputting modulated modulation light. The reflective spatial light modulator includes a perovskite-type electro-optic crystal having an input surface to which the input light is input and a rear surface opposing the input surface, and having a relative dielectric constant of 1,000 or higher; a light input/output unit being disposed on the input surface of the electro-optic crystal and having a first electrode through which the input light is transmitted; a light reflection unit including a substrate on which a plurality of second electrodes is disposed and an adhesive layer for fixing the substrate to the rear surface, being disposed on the rear surface of the electro-optic crystal, and reflecting the input light toward the input/output unit; and a drive circuit applying an electric field between the first electrode and the plurality of second electrodes. The substrate includes a pixel region in which the plurality of second electrodes is disposed, and a surrounding region surrounding the pixel region. The adhesive layer has a first region facing the pixel region, and a second region surrounding the first region. The adhesive layer has a dielectric material in a cured product made of a non-conductive adhesive material. A content of the dielectric material in the second region is lower than a content of the dielectric material in the first region.

In addition, according to another aspect, there is provided an optical observation device including a light source outputting the input light, the reflective spatial light modulator described above, an optical system irradiating a target with modulation light output from the spatial light modulator, and a photodetector detecting light output from the target.

In addition, according to still another aspect, there is provided a light irradiation device including a light source outputting the input light, the reflective spatial light modulator described above, and an optical system irradiating a target with modulation light output from the spatial light modulator.

According to the reflective spatial light modulator, the light irradiation device, and the optical observation device described above, input light is transmitted through the light input/output unit and is input to the input surface of the electro-optic crystal. This input light can be reflected by the light reflection unit disposed on the rear surface of the electro-optic crystal and can be output from the light input/output unit. At this time, an electrical signal is input between the first electrode provided in the light input/output unit and the plurality of second electrodes provided on the substrate. Accordingly, an electric field is applied to the electro-optic crystal having a high relative dielectric constant, and thus the input light can be modulated. In this reflective spatial light modulator, the plurality of second electrodes is fixed to the rear surface by the adhesive layer including a non-conductive adhesive material and a dielectric material. Since the adhesive layer is non-conductive, an electrical signal input to each of the plurality of second electrodes is unlikely to spread in the adhesive layer. Thus, mixing of electrical signals input to the plurality of electrodes is curbed. In addition, injection of charge into the electro-optic crystal from the adhesive layer is curbed. Therefore, the modulation accuracy can become stable. In addition, in the adhesive layer, the content of the dielectric material in the second region is lower than the content of the dielectric material in the first region. For this reason, the second region allows a substrate to be fixed to the rear surface of the electro-optic crystal with an adhesive force greater than that of the first region. Accordingly, falling-off of a substrate from the electro-optic crystal is curbed.

In addition, in the aspect, a boundary between the first region and the second region may be positioned on a side outward from an edge of a boundary between the pixel region and the surrounding region when viewed in an input direction of the input light. In this configuration, an area of the first region can be larger than an area of the pixel region in a plan view.

In addition, in the aspect, the boundary between the first region and the second region may coincide with the boundary between the pixel region and the surrounding region when viewed in the input direction of the input light. In this configuration, the electro-optic crystal and the substrate can be more firmly bonded to each other.

In addition, the light input/output unit may include a different adhesive layer for fixing the first electrode to the input surface. The different adhesive layer may have a first region facing the pixel region and having a dielectric material in a cured product made of a non-conductive adhesive material, and a second region surrounding the first region. The content of the dielectric material in the second region of the different adhesive layer may be lower than the content of the dielectric material in the first region of the different adhesive layer. In this configuration, injection of charge into the electro-optic crystal from the first electrode is curbed. In addition, since the second region is formed, the first electrode and the electro-optic crystal can be firmly fixed to each other.

In addition, in the aspect, the light input/output unit may further include a transparent substrate having a first surface to which the input light is input and a second surface serving as a surface on a side opposite to the first surface, and the first electrode may be disposed on the second surface of the transparent substrate. In such a spatial light modulator, even when the electro-optic crystal is formed to be thin in an optical axis direction, the electro-optic crystal can be protected by the transparent substrate from an external impact or the like.

In addition, in the aspect, when the relative dielectric constant of the electro-optic crystal is $\varepsilon_{xtl}$, a thickness of the electro-optic crystal from the input surface to the rear surface is $d_{xtl}$, a thickness of the adhesive layer is $d_{ad}$, and a ratio $V_{xtl}/V_{smax}$ of $V_{xtl}$ indicating a voltage applied to the electro-optic crystal in order to perform phase modulation or retardation modulation of input light by $2\pi$ radians to $V_{smax}$ indicating a maximum voltage of an application voltage generated by the drive circuit is $R_s$, a relative dielectric constant $\varepsilon_{ad}$ of the adhesive layer including the dielectric material may be indicated by Expression 1. In this case, a voltage sufficient for performing phase modulation or retardation modulation of input light by $2\pi$ radians can be applied to the electro-optic crystal.

[Math. 1]

$$\varepsilon_{ad} > \left( \frac{\varepsilon_{xtl} \cdot R_s}{d_{xtl} \cdot (1 - R_s)} \right) \cdot d_{ad} \quad (1)$$

In addition, in the aspect, the first electrode may be formed on the whole surface of the input surface. For example, when a plurality of first electrodes are provided in a manner corresponding to the plurality of second electrodes, it is difficult to positionally align the first electrodes and the second electrodes with each other. In the foregoing configuration, there is no need to positionally align the first electrode and the second electrodes with each other.

In addition, in the aspect, the light reflection unit may further include a plurality of third electrodes disposed on the rear surface of the electro-optic crystal in a manner of facing the plurality of second electrodes. According to this configuration, the plurality of third electrodes can prevent spreading of an electrical signal transferred as an electric line of force.

In addition, in the aspect, in the light reflection unit, the input light may be reflected by the plurality of third electrodes. Moreover, in the aspect, in the light reflection unit, the input light may be reflected by the plurality of second electrodes. According to these configurations, there is no need to separately provide a reflection layer or the like on the second electrode side.

In addition, in the aspect, the electro-optic crystal may be a $KTa_{1-x}Nb_xO_3$ ($0 \leq x \leq 1$) crystal, a $K_{1-y}Li_yTa_{1-x}Nb_xO_3$ ($0 \leq x \leq 1$ and $0 < y < 1$) crystal, or a PLZT crystal. According to this configuration, an electro-optic crystal having a high relative dielectric constant can be easily realized.

In addition, in the aspect, the reflective spatial light modulator may further include a temperature control element for controlling a temperature of the electro-optic crystal. According to this configuration, modulation accuracy can become more stable by maintaining a uniform temperature in the electro-optic crystal.

Advantageous Effects of Invention

According to the reflective spatial light modulator, the light irradiation device, and the optical observation device of the embodiment, mixing of electrical signals input to a plurality of electrodes can be curbed, and thus the modulation accuracy can become stable.

BRIEF DESCRIPTION OF DRAWINGS

FIG. 3 is a view showing a relationship between crystal axes, a traveling direction of light, and an electric field in retardation modulation.

DESCRIPTION OF EMBODIMENTS

Hereinafter, embodiments will be specifically described with reference to the drawings. For the sake of convenience, there are cases in which the same reference signs are applied to elements which are substantially the same and description thereof is omitted.

First Embodiment

Figure 1:
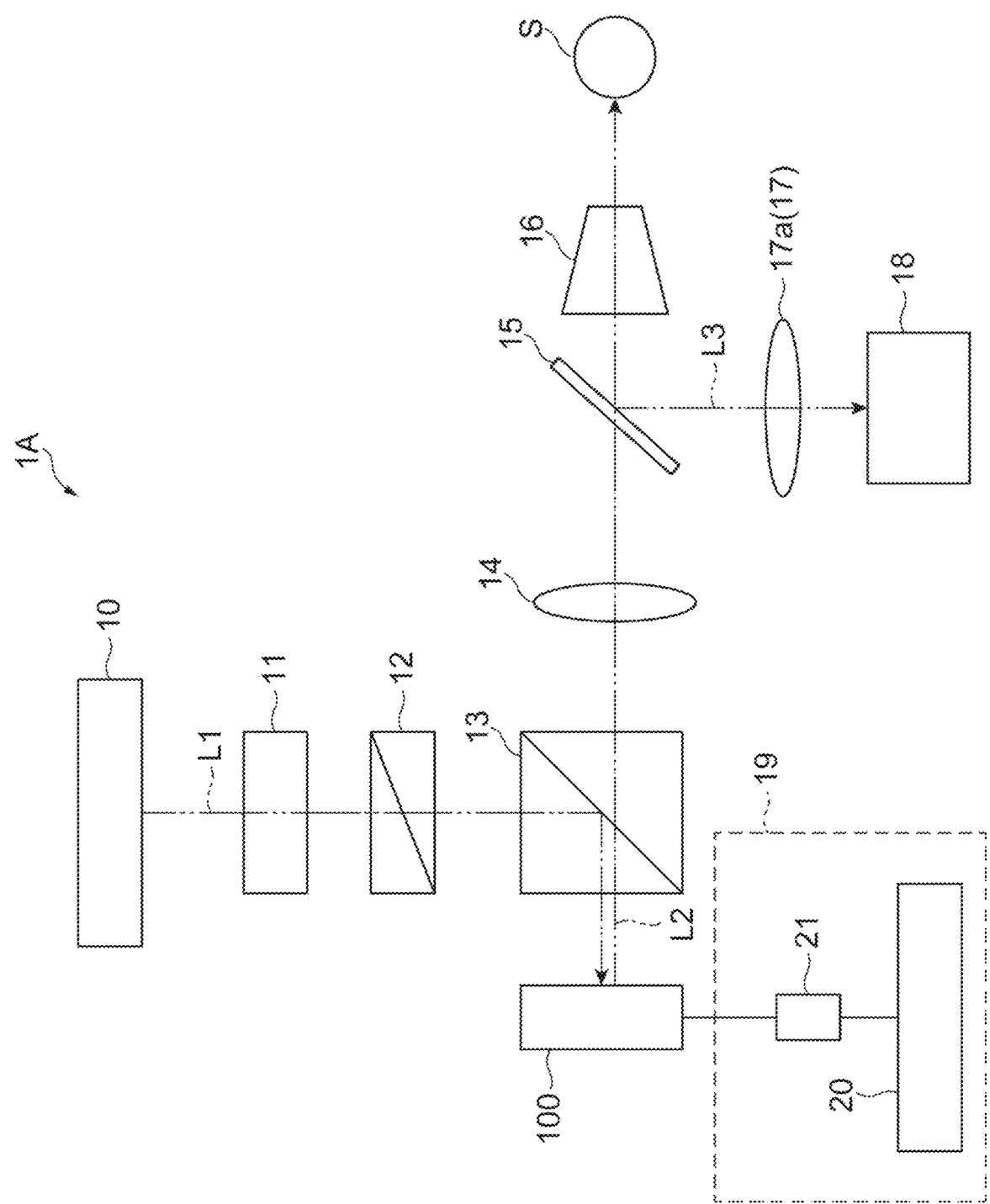
FIG. 1 is a block diagram showing a configuration of an optical observation device according to an embodiment.

FIG. 1 is a block diagram showing a configuration of an optical observation device according to an embodiment. For example, an optical observation device 1A is a fluorescence microscope for capturing an image of an observation target. The optical observation device 1A acquires an image of a specimen (target) S by irradiating a front surface of the specimen S with input light L1 and capturing an image of detection light L3 such as fluorescence or reflected light output from the specimen S in response to the irradiation.

For example, the specimen S which becomes an observation target is a sample such as a cell or an organism including a fluorescent material such as a fluorescent dye or fluorescent protein. In addition, the specimen S may be a sample such as a semiconductor device or a film. The specimen S emits the detection light L3 such as fluorescence, for example, when irradiation with light (excitation light or illumination light) having a predetermined wavelength region is performed. For example, the specimen S is accommodated inside a holder having transmitting properties with respect to at least the input light L1 and the detection light L3. For example, this holder is held on a stage.

As shown in FIG. 1, the optical observation device 1A includes a light source 10, a collimator lens 11, a polarization element 12, a polarization beam splitter 13, a spatial light modulator 100, a first optical system 14, a beam splitter 15, an objective lens 16, a second optical system 17, a photodetector 18, and a control unit 19.

The light source 10 outputs the input light L1 including a wavelength for exciting the specimen S. For example, the light source 10 emits coherent light or incoherent light. Examples of a coherent light source include a laser light source such as a laser diode (LD). Examples of an incoherent light source include a light emitting diode (LED), a super luminescent diode (SLD), and a lamp system light source.

The collimator lens 11 collimates the input light L1 output from the light source 10 and outputs the collimated input light L1. The polarization element 12 allows the input light L1 to be selectively transmitted therethrough in accordance with a polarization component. For example, the polarization element 12 allows S-wave light of the input light L1 to be transmitted therethrough. The polarization beam splitter 13 reflects the input light L1 transmitted through the polarization element 12 toward the spatial light modulator 100. The spatial light modulator 100 is a spatial light modulator performing phase modulation or retardation modulation of the input light L1 output from the light source 10. The spatial light modulator 100 modulates the input light L1 input through the collimator lens 11 and outputs modulated modulation light L2 toward the polarization beam splitter 13. At this time, the spatial light modulator 100 outputs the modulation light L2 by rotating a polarization surface of the input light L1 by 90 degrees. For this reason, the modulation light L2 output from the spatial light modulator 100 is transmitted through the polarization beam splitter 13 and is optically guided to the first optical system 14. The spatial light modulator 100 in the present embodiment is constituted as a reflective type. The spatial light modulator 100 is electrically connected to a controller 21 of the control unit 19 and constitutes a spatial light modulation unit. Driving of the spatial light modulator 100 is controlled by the controller 21 of the control unit 19. Details of the spatial light modulator 100 will be described below. Using the spatial light modulator 100, 1) a position of an irradiation location can be limited, 2) the position of the irradiation location can be moved, 3) a plurality of irradiation locations can be formed at the same time, and 4) a phase of irradiation light can be controlled.

The first optical system 14 optically joins the spatial light modulator 100 and the objective lens 16 to each other. Accordingly, the modulation light L2 output from the spatial light modulator 100 is optically guided to the objective lens 16. For example, the first optical system 14 is a lens, which concentrates the modulation light L2 from the spatial light modulator 100 at a pupil of the objective lens 16.

The beam splitter 15 is an optical element for separating the modulation light L2 and the detection light L3 from each other. For example, the beam splitter 15 allows the modulation light L2 having an excitation wavelength to be transmitted therethrough and reflects the detection light L3 having a fluorescent wavelength. In addition, the beam splitter 15 may be a polarization beam splitter or may be a dichroic mirror. Depending on optical systems (for example, the first optical system 14 and the second optical system 17) in front of and behind the beam splitter 15 or the kind of an applied microscope, the beam splitter 15 may reflect the modulation light L2 and may allow the detection light L3 having a fluorescent wavelength to be transmitted therethrough.

The objective lens 16 concentrates the modulation light L2 modulated by the spatial light modulator 100, irradiates the specimen S with the concentrated light, and optically guides the detection light L3 emitted from the specimen S in response to the irradiation. For example, the objective lens 16 is configured to be able to be moved along an optical axis by a driving element such as a piezo-actuator or a stepping motor. Accordingly, a concentration position of the modulation light L2 and a focal position for detecting the detection light L3 can be adjusted.

The second optical system 17 optically joins the objective lens 16 and the photodetector 18 to each other. Accordingly, an image of the detection light L3 optically guided from the objective lens 16 is formed by the photodetector 18. The second optical system 17 has a lens 17a for forming an image of the detection light L3 from the objective lens 16 on a light receiving surface of the photodetector 18.

The photodetector 18 captures an image of the detection light L3 which is optically guided by the objective lens 16 and of which an image is formed on the light receiving surface. For example, the photodetector 18 is an area image sensor such as a CCD image sensor or a CMOS image sensor.

The control unit 19 includes a computer 20 which includes a control circuit such as a processor, an image processing circuit, a memory, and the like; and the controller 21 which includes a control circuit such as a processor, a memory, and the like and is electrically connected to the spatial light modulator 100 and the computer 20. For example, the computer 20 is a personal computer, a smart device, a microcomputer, a cloud server, or the like. The computer 20 controls operation of the objective lens 16, the photodetector 18, and the like and executes various kinds of control using the processor. In addition, the controller 21 controls a phase modulation quantity or a retardation modulation quantity in the spatial light modulator 100.

Figure 2:
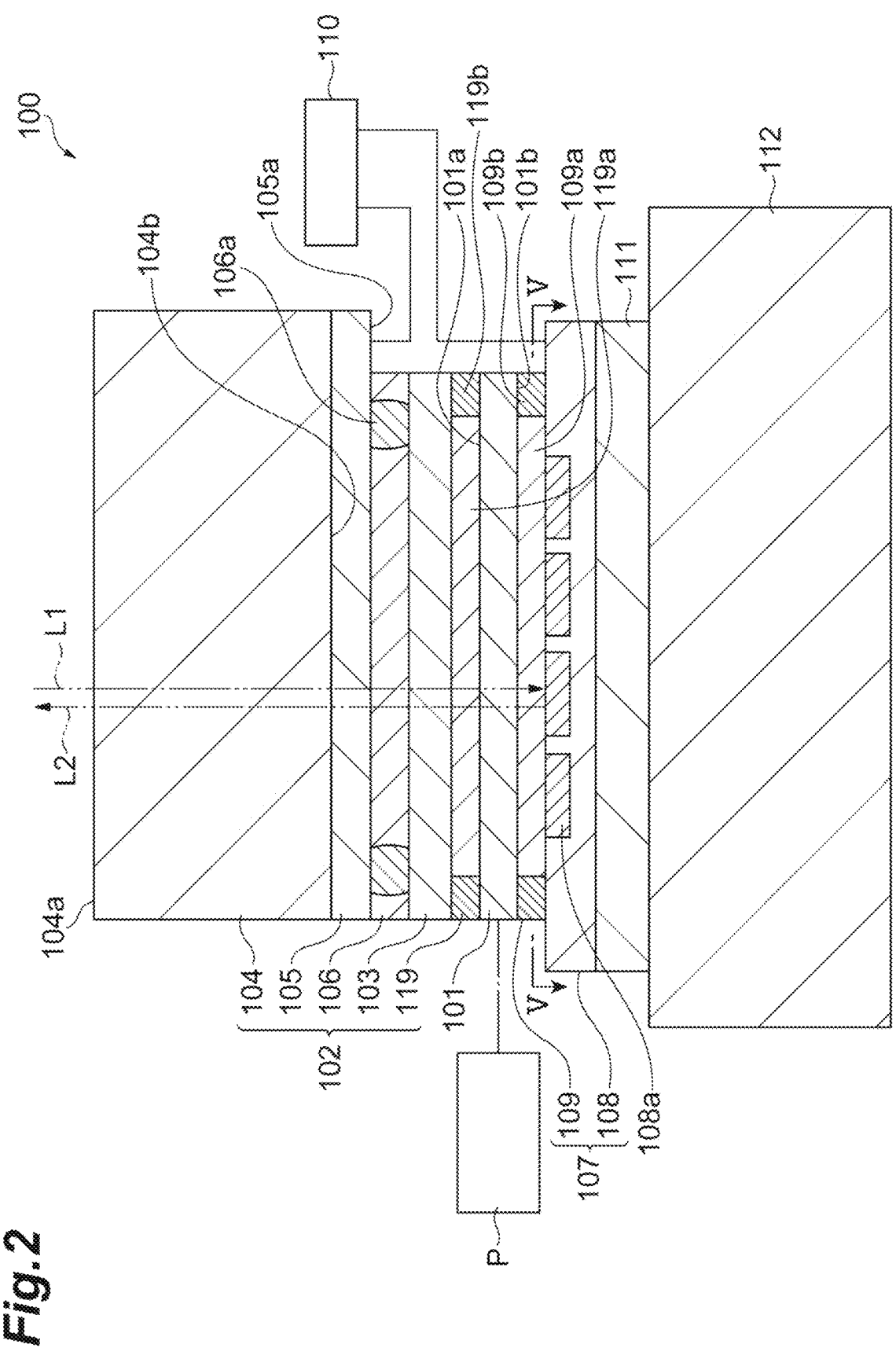
FIG. 2 is a cross-sectional view showing a spatial light modulator used in the optical observation device in FIG. 1.

Next, the spatial light modulator 100 will be described in detail. FIG. 2 is a cross-sectional view showing a spatial light modulator. The spatial light modulator 100 is a reflective spatial light modulator modulating the input light L1 and outputting the modulated modulation light L2. As shown in FIG. 2, the spatial light modulator 100 includes an electro-optic crystal 101, a light input/output unit 102, a light reflection unit 107, and a drive circuit 110. In the present embodiment, the thickness of the electro-optic crystal 101 in an optical axis direction may be 50 μm or smaller, for example.

The electro-optic crystal 101 exhibits a plate shape having an input surface 101a to which the input light L1 is input, and a rear surface 101b opposing the input surface 101a. The electro-optic crystal 101 has a perovskite-type crystal structure and utilizes an electro-optical effect such as a Pockels effect or a Kerr effect for changing a refractive index. The electro-optic crystal 101 having a perovskite-type crystal structure is an isotropic crystal which belongs to a point group m3m of a cubic crystal system and of which a relative dielectric constant is 1,000 or higher. For example, the relative dielectric constant of the electro-optic crystal 101 can have a value within a range of approximately 1,000 to 20,000. Examples of such an electro-optic crystal 101 include a $KTa_{1-x}Nb_xO_3$ ($0 \le x \le 1$) crystal (which will hereinafter be referred to as a KTN crystal ), a $K_{1-y}Li_y Ta_{1-x}Nb_xO_3$ ($0 \le x \le 1$ and $0 < y < 1$) crystal, and a PLZT crystal. Specifically, $BaTiO_3$, $K_3Pb_3(Zn_2Nb_7)O_{27}$, $K(Ta_{0.65}Nb_{0.35})P_3$, $Pb_3MgNb_2O_9$, $Pb_3NiNb_2O_9$, and the like are included. In the spatial light modulator 100 of the present embodiment, a KTN crystal is used as the electro-optic crystal 101. Since a KTN crystal is in an m3m point group of a cubic crystal system, modulation is performed using a Kerr effect instead of a Pockels effect. For this reason, phase modulation can be performed by inputting light in a manner of being parallel or perpendicular to crystal axes of the electro-optic crystal 101 and applying an electric field in the same direction. In addition, retardation modulation can be performed when two arbitrary crystal axes are rotated about the remaining axis by an angle other than 0° and 90°. FIG. 3(a) is a perspective view showing a relationship between the crystal axes, a traveling direction of light, and an electric field in retardation modulation, and FIG. 3(b) is a plan view showing each of the axes. The example in FIG. 3 shows a case in which the crystal is rotated by an angle of 45°. When the axes X2 and X3 are rotated by 45° about the axis X1 and new axes X1', X2', and X3' are set, retardation modulation can be performed by inputting light in a manner of being parallel or perpendicular to these new axes. In FIG. 3, an electric field is applied in an applying direction 1102 of a crystal 1104. A propagation direction 1101 of the input light L1 becomes parallel to the applying direction 1102 of an electric field. In this case, Kerr coefficients used for modulation of the input light L1 become g11, g12, and g44.

The relative dielectric constant of a KTN crystal is likely to be affected by the temperature. For example, the relative dielectric constant becomes approximately 20,000 which is the largest at a temperature in the vicinity of −5° C., and the relative dielectric constant falls to approximately 5,000 at a temperature near 20° C. which is a normal temperature. Here, the electro-optic crystal 101 is controlled such that it has a temperature in the vicinity of −5° C. by a temperature control element P such as a Peltier element, for example.

The light input/output unit 102 has a first electrode 103, a transparent substrate 104, a transparent electrode 105, an adhesive layer 106, and an adhesive layer (different adhesive layer) 119. The first electrode 103 is disposed on the input surface 101a side of the electro-optic crystal 101. For example, the first electrode 103 is a transparent electrode formed of indium tin oxide (ITO), and the input light L1 is transmitted therethrough. In the present embodiment, the first electrode 103 is formed on the whole surface on the input surface 101a side. The input light L1 is transmitted through the first electrode 103 and is input to the inside of the electro-optic crystal 101.

For example, the transparent substrate 104 is formed of a material such as glass, quartz, or plastic in a flat plate shape. The transparent substrate 104 has a first surface 104a to which the input light L1 is input, and a second surface 104b which is a surface on a side opposite to the first surface 104a and faces the input surface 101a of the electro-optic crystal 101. The transparent electrode 105 is an electrode formed on the whole surface of the second surface 104b of the transparent substrate 104, and the input light L1 is transmitted therethrough. For example, the transparent electrode 105 can be formed on the second surface 104b of the transparent substrate 104 by performing vapor deposition of ITO.

The adhesive layer 106 causes the first electrode 103 formed in the electro-optic crystal 101 and the transparent electrode 105 formed in the transparent substrate 104 to adhere to each other. For example, the adhesive layer 106 is formed of an epoxy-based adhesive, and the input light L1 is transmitted therethrough. For example, conductive members 106a such as metal spheres are disposed inside the adhesive layer 106. The conductive members 106a come into contact with both the first electrode 103 and the transparent electrode 105 and electrically connect the first electrode 103 and the transparent electrode 105 to each other. For example, the conductive members 106a are disposed in four corners of the adhesive layer 106 in a plan view.

The adhesive layer 119 is disposed between the first electrode 103 and the input surface 101a and bonds the first electrode 103 and the electro-optic crystal 101 to each other. The adhesive layer 119 of the present embodiment has a first region 119a forming the center thereof and a second region 119b surrounding an outer circumference of the first region 119a. The first region 119a has fine particles of a dielectric material in a cured product made of a non-conductive adhesive material and includes no conductive material. The term non-conductive is not limited to properties of having no conductivity and includes highly insulating properties and properties of having high electrical resistivity. That is, the first region 119a has high insulating properties (high electrical resistivity) and ideally has no conductivity.

For example, an adhesive material can be formed using an optically colorless and transparent resin such as an epoxy-based adhesive. For example, the dielectric material can have a relative dielectric constant of the same degree as that of the electro-optic crystal 101, which is within a range of approximately 100 to 30,000. The dielectric material may be a powder having a particle size equal to or smaller than the wavelength of the input light L1 and can have a particle size within a range of approximately 50 nm to 3,000 nm, for example. Scattering of light can be curbed by reducing the particle size of the dielectric material. When scattering of light is taken into consideration, the particle size of the dielectric material may be 1,000 nm or smaller and may also be 100 nm or smaller. The dielectric material may be a powder of the electro-optic crystal 101. As an example, the proportion of the dielectric material in a mixture of an adhesive material and a dielectric material may be approximately 50%. For example, the first region 119a exhibits a rectangular shape in a plan view.

The second region 119b is constituted of a non-conductive adhesive material. That is, differing from the first region 119a, the second region 119b includes no dielectric material such as a powder of the electro-optic crystal 101. For example, the adhesive material can be formed using an optically colorless and transparent resin such as an epoxy-based adhesive. The second region 119b may include a dielectric material as in the first region. In such a case, the proportion of the dielectric material in a mixture of an adhesive material and a dielectric material is smaller than the proportion thereof in the first region 119a. For example, the first region 119a exhibits a rectangular frame shape in a plan view.

The first region 119a can be formed by coating the input surface 101a of the electro-optic crystal 101 or the first electrode 103 with a mixture of an adhesive material and a dielectric material. In addition, the second region 119b can be formed by coating the input surface 101a of the electro-optic crystal 101 or the first electrode 103 with an adhesive material.

Figure 4:
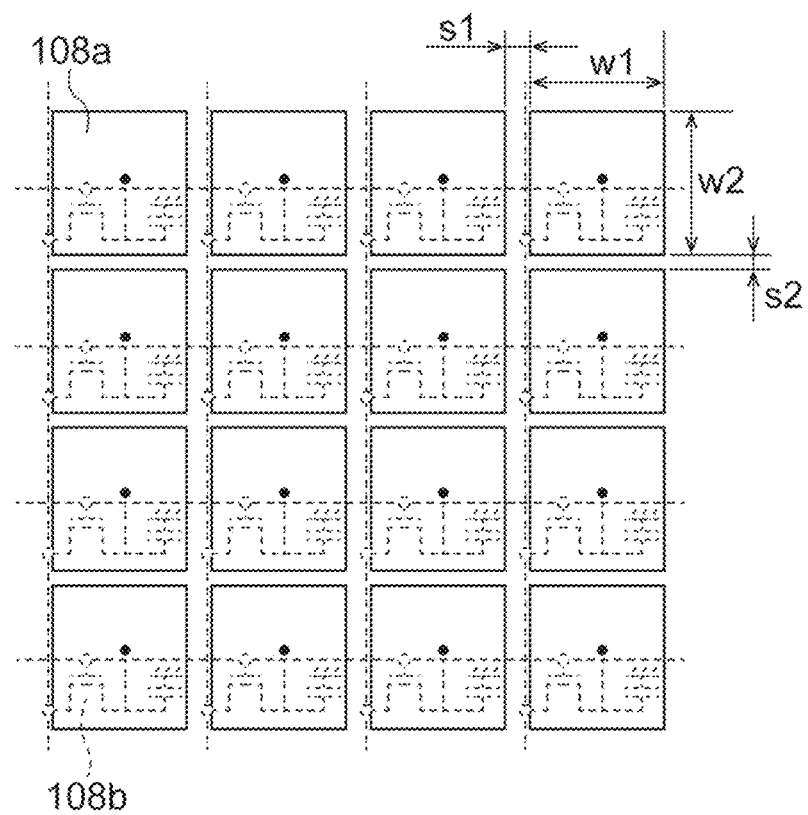
FIG. 4 is a view for describing an electrode of the spatial light modulator in FIG. 2.

The light reflection unit 107 is disposed on the rear surface 101b side of the electro-optic crystal 101 and reflects the modulation light L2 toward the input/output unit. This light reflection unit 107 includes a CMOS substrate (substrate) 108 and an adhesive layer 109. The CMOS substrate 108 is fixed to a substrate 112 such as an organic substrate including a glass epoxy (epoxy resin having a glass fiber sheet as a core material) substrate, or a ceramic substrate with an adhesive layer 111 therebetween, for example. The CMOS substrate 108 includes second electrodes 108a which are a plurality of pixel electrodes facing the rear surface 101b of the electro-optic crystal 101. The second electrodes 108a can reflect the input light L1 propagated inside the electro-optic crystal 101 toward the light input/output unit 102. For example, the second electrodes 108a are formed of a material such as a metal (aluminum or the like). As shown in FIG. 4, in the light reflection unit 107 in the present embodiment, the plurality of second electrodes 108a formed to have a rectangular shape in a plan view is disposed in a two-dimensional array. A length W1 in a transverse direction and a length W2 in a vertical direction of the second electrode 108a can be formed to be the same length, for example. Second electrodes 108a adjacent to each other are disposed with gaps S1 and S2 therebetween. FIGS. 2 and 4 schematically show the spatial light modulator 100. For the sake of simplification of description, an example in which the second electrodes 108a are disposed in a 4×4 array is described. The CMOS substrate 108 may function as a drive circuit applying an electric field between the first electrode 103 and the second electrodes 108a.

Each of the plurality of second electrodes 108a is provided with a corresponding driving switch 108b. An arbitrary voltage can be controlled for each of the second electrodes 108a using these switches 108b.

The adhesive layer 109 fixes the CMOS substrate 108 to the rear surface 101b. The adhesive layer 109 of the present embodiment has a first region 109a forming the center thereof and a second region 109b surrounding an outer circumference of the first region 109a. The configuration of the adhesive layer 109 is similar to that of the adhesive layer 119 described above. The first region 109a has a configuration similar to that of the first region 119a, and the second region 109b has a configuration similar to that of the second region 119b.

The first region 109a can be formed by coating the rear surface 101b of the electro-optic crystal 101 or the CMOS substrate 108 with a mixture of an adhesive material and a dielectric material. In addition, the second region 109b can be formed by coating the rear surface 101b of the electro-optic crystal 101 or the CMOS substrate 108 with an adhesive material.

The drive circuit 110 is electrically connected to the first electrode 103 and is connected to the CMOS substrate 108, thereby being electrically connected to each of the plurality of second electrodes 108a. In the present embodiment, the transparent substrate 104 on the second surface 104b side is formed to have a larger size in a plan view than the input surface 101a of the electro-optic crystal 101. For this reason, in a state in which the electro-optic crystal 101 is supported by the transparent substrate 104, a part of the transparent electrode 105 formed in the transparent substrate 104 becomes an exposed portion 105a exposed to the outside. The drive circuit 110 is electrically connected to this exposed portion 105a and the CMOS substrate 108. That is, since the drive circuit 110 is electrically connected to the first electrode 103 with the transparent electrode 105 and the conductive members 106a therebetween, an electric field can be applied between the first electrode 103 and the second electrodes 108a.

The drive circuit 110 is controlled by the control unit 19. The drive circuit 110 inputs an electrical signal between the first electrode 103 and the second electrodes 108a. Accordingly, an electric field is applied to the electro-optic crystal 101 and the adhesive layers 109 and 119 disposed between the first electrode 103 and the second electrodes 108a. In this case, a voltage applied by the drive circuit 110 is distributed to the electro-optic crystal 101 and the adhesive layers 109 and 119. Therefore, when a voltage applied to the electro-optic crystal 101 is $V_{xtl}$, a voltage applied to the adhesive layers 109 and 119 is $V_{ad}$, the relative dielectric constant of the electro-optic crystal 101 is $\varepsilon_{xtl}$, the thickness of the electro-optic crystal 101 from the input surface 101a to the rear surface 101b is $d_{xtl}$, the relative dielectric constant of the adhesive layers 109 and 119 is $\varepsilon_{ad}$, and the sum of the thicknesses of the adhesive layers 109 and 119 is $d_{ad}$, a voltage ratio R between a voltage applied between the first electrode 103 and the second electrodes 108a and a voltage applied to the electro-optic crystal 101 is expressed by the following Expression (2). For the sake of simplification of description, the adhesive layer 109 and the adhesive layer 119 are formed of materials having the same relative dielectric constant.

[Math. 2]

$$R = \frac{V_{xtl}}{V_{xtl} + V_{ad}} = \frac{\varepsilon_{ad} \cdot d_{xtl}}{(\varepsilon_{xtl} \cdot d_{ad} + \varepsilon_{ad} \cdot d_{xtl})} \quad (2)$$

In this manner, a voltage applied to the electro-optic crystal 101 depends on the relative dielectric constant $\varepsilon_{ad}$ and the thicknesses $d_{ad}$ of the adhesive layers 109 and 119. For example, the spatial light modulator 100 in the present embodiment has a modulation performance of outputting the modulation light L2 obtained by modulating the input light L1 by one wavelength. In this case, the relative dielectric constant $\varepsilon_{ad}$ of the adhesive layers 109 and 119 is obtained as follows. First, the upper limit for a voltage applied to the CMOS substrate 108 by the drive circuit 110 is determined in order to avoid a breakdown of a CMOS circuit. Here, the maximum voltage of an application voltage generated by the drive circuit 110 is referred to as $V_{smax}$. In addition, it is assumed that when $V_{xtl}$ is added to the electro-optic crystal 101 and $V_{ad}$ is added to the adhesive layers 109 and 119 respectively, the modulation light L2 modulated by one wavelength is output. At this time, $V_{xtl} < V_{xtl} + V_{ad} \leq V_{smax}$ is established. Therefore, when a voltage ratio $V_{xtl}/V_{smax}$ between $V_{xtl}$ and $V_{smax}$ is $R_s$, there is a need for the voltage ratio R and the voltage ratio $R_s$ to satisfy the relationship of the following Expression (3). In this case, a voltage sufficient for performing phase modulation of the input light L1 by 2π radians can be applied to the electro-optic crystal 101.

$$R_s < R \quad (3)$$

Further, from Expression (2) and Expression (3), the relative dielectric constant $\varepsilon_{ad}$ and the thicknesses $d_{ad}$ of the adhesive layers 109 and 119 satisfy the following Expression (4).

[Math. 3]

$$R_s < \frac{\varepsilon_{ad} \cdot d_{xtl}}{(\varepsilon_{xtl} \cdot d_{ad} + \varepsilon_{ad} \cdot d_{xtl})} \quad (4)$$

From this Expression (4), the relative dielectric constant of the adhesive layers 109 and 119 is obtained. That is, when Expression (4) is transformed into an expression related to the relative dielectric constant of the adhesive layers 109 and 119, the following Expression (1) is derived.

[Math. 4]

$$\varepsilon_{ad} > \left(\frac{\varepsilon_{xtl} \cdot R_s}{d_{xtl} \cdot (1 - R_s)}\right) \cdot d_{ad} \quad (1)$$

When the relative dielectric constant of the adhesive layers 109 and 119 satisfies Expression (1), an electric field sufficient for performing modulation of the input light L1 by one wavelength can be applied to the electro-optic crystal.

In addition, when a parameter m indicated by the following Expression (5) is defined using the relative dielectric constant $\varepsilon_{ad}$ of the adhesive layers 109 and 119, the thicknesses $d_{ad}$ of the adhesive layers 109 and 119, the relative dielectric constant $\varepsilon_{xtl}$ of the electro-optic crystal 101, and the thickness $d_{xtl}$ of the electro-optic crystal 101, it is preferable that the parameter m satisfy m>0.3. In addition, it is more preferable that the parameter m satisfy m>3.

[Math. 5]

$$m = \frac{\varepsilon_{ad} \cdot d_{xtl}}{2 \cdot \varepsilon_{xtl} \cdot d_{ad}} \quad (5)$$

Figure 5:
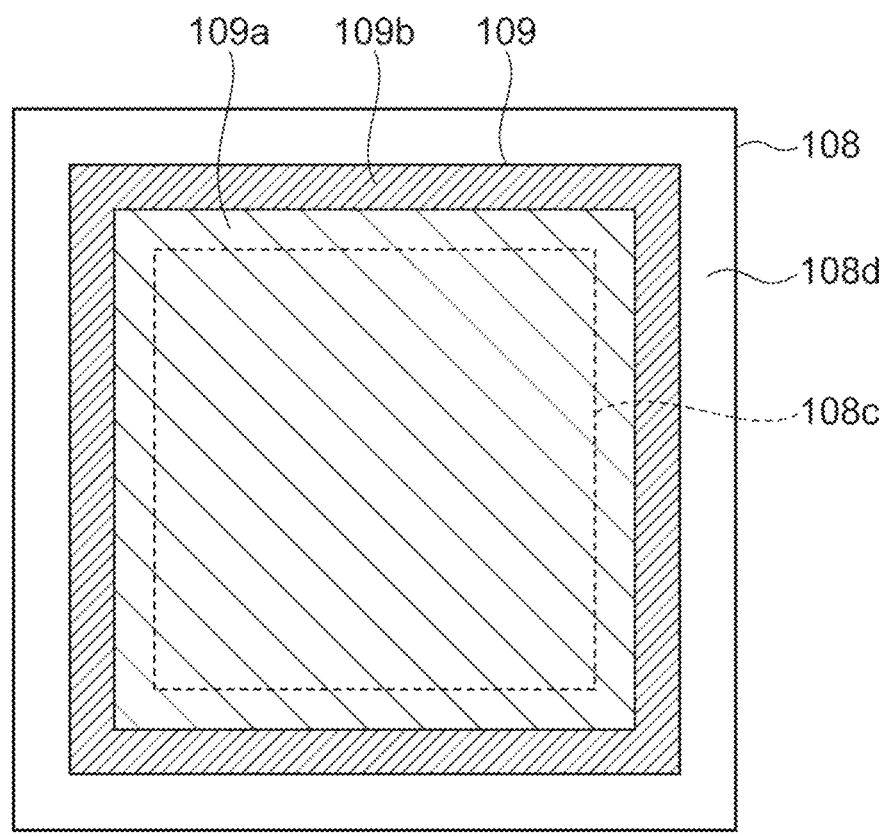
FIG. 5 is a cross-sectional view along V-V in FIG. 2.

Subsequently, a relationship between the adhesive layer 109, the adhesive layer 119, and the CMOS substrate 108 will be described. In the present embodiment, since the adhesive layer 109 and the adhesive layer 119 exhibit configurations similar to each other, the adhesive layer 109 will be representatively described here. FIG. 5 is a cross-sectional view along V-V in FIG. 2. As shown in FIG. 5, the CMOS substrate 108 includes a pixel region 108c and a surrounding region 108d surrounding the pixel region 108c. The pixel region 108c is a region in which the plurality of second electrodes 108a (refer to FIGS. 2 and 4) is disposed and which exhibits a rectangular shape as an example. The surrounding region 108d exhibits a rectangular frame shape. The first region 109a of the adhesive layer 109 faces the pixel region 108c and exhibits a rectangular shape in a plan view. The second region 109b of the adhesive layer 109 surrounds the first region 109a and exhibits a rectangular frame shape in a plan view. A boundary between the first region 109a and the second region 109b is positioned on a side outward from an edge of a boundary between the pixel region 108c and the surrounding region 108d in a plan view.

That is, when viewed in an input direction of the input light L1, the first region 109a exhibits a rectangular shape larger than the pixel region 108c. The second region 109b is disposed between the surrounding region 108d and the rear surface 101b of the electro-optic crystal 101.

According to the spatial light modulator 100 described above, the input light L1 is transmitted through the first electrode 103 of the light input/output unit 102 and is input to the input surface 101a of the electro-optic crystal 101. This input light L1 can be reflected by the light reflection unit 107 disposed on the rear surface 101b of the electro-optic crystal 101 and can be output from the light input/output unit 102. At this time, an electrical signal is input between the first electrode 103 provided in the light input/output unit 102 and the plurality of second electrodes 108a provided on the CMOS substrate 108. Accordingly, an electric field is applied to the electro-optic crystal 101 having a high relative dielectric constant, and thus the input light L1 can be modulated.

In this spatial light modulator 100, the plurality of second electrodes 108a is fixed to the rear surface 101b by the adhesive layer 109 including a non-conductive adhesive material and a dielectric material. Since the adhesive layer 109 is non-conductive, an electrical signal input to each of the plurality of second electrodes 108a is unlikely to spread in the adhesive layer 109. For this reason, mixing of electrical signals input to the plurality of second electrodes 108a is curbed. In addition, injection of charge into the electro-optic crystal 101 from the adhesive layer 109 is curbed. Similarly, injection of charge into the electro-optic crystal 101 from the adhesive layer 119 is curbed. Therefore, the modulation accuracy can become stable.

In the configuration of the present embodiment, the higher the relative dielectric constant of the adhesive layers 109 and 119, the easier it is to apply a voltage to the electro-optic crystal 101. For this reason, it is desirable that the content of the dielectric material in the adhesive layers 109 and 119 be high. However, if the content of the dielectric material is increased, an adhesive force in the adhesive layer deteriorates. In the present embodiment, the contents of the dielectric materials in the second regions 109b and 119b are lower than the contents of the dielectric materials in the first regions 109a and 119a. For this reason, the second regions 109b and 119b allow the CMOS substrate 108 and the first electrode 103 to be fixed to the electro-optic crystal 101 with an adhesive force greater than that of the first regions 109a and 119a.

The boundary between the first region 109a and the second region 109b is positioned on the side outward from the edge of the boundary between the pixel region 108c and the surrounding region 108d when viewed in the input direction of the input light. The area of the first region 109a in a plan view can be larger than the area of the pixel region 108c. For this reason, positional alignment between the pixel region 108c and the first region 109a can be easily performed.

The first electrode 103 is formed on the whole surface of the input surface 101a. For example, when a plurality of first electrodes 103 are provided in a manner corresponding to the plurality of second electrodes 108a, it is difficult to positionally align the first electrodes 103 and the second electrodes 108a with each other. In the foregoing configuration, there is no need to positionally align the first electrode 103 and the second electrodes 108a with each other.

In the light reflection unit 107, since the input light L1 is reflected by the plurality of second electrodes 108a, there is no need to separately provide a reflection layer or the like on the second electrodes 108a side.

In addition, since the temperature control element P for controlling the temperature of the electro-optic crystal 101 is provided, a uniform temperature can be maintained in the electro-optic crystal 101. Accordingly, modulation accuracy can become more stable. The temperature control may be performed by the temperature control element P targeting not only the electro-optic crystal 101 but also the spatial light modulator 100 in its entirety including the CMOS substrate 108 and the like.

In addition, in the spatial light modulator 100, phase modulation or retardation modulation can be performed more favorably by forming the electro-optic crystal 101 to be thin in the optical axis direction. When the electro-optic crystal 101 is formed to be thin in this manner, there is concern that the electro-optic crystal 101 may be damaged due to an impact or the like from the outside. In the present embodiment, the input surface 101a side of the electro-optic crystal 101 is supported by the transparent substrate 104, and thus the electro-optic crystal 101 is protected from an external impact or the like.

Second Embodiment

Subsequently, a spatial light modulator 200 according to the present embodiment will be described. Points differing from the first embodiment will be mainly described. The same reference signs are applied to elements or members which are the same, and detailed description thereof will be omitted.

Figure 6:
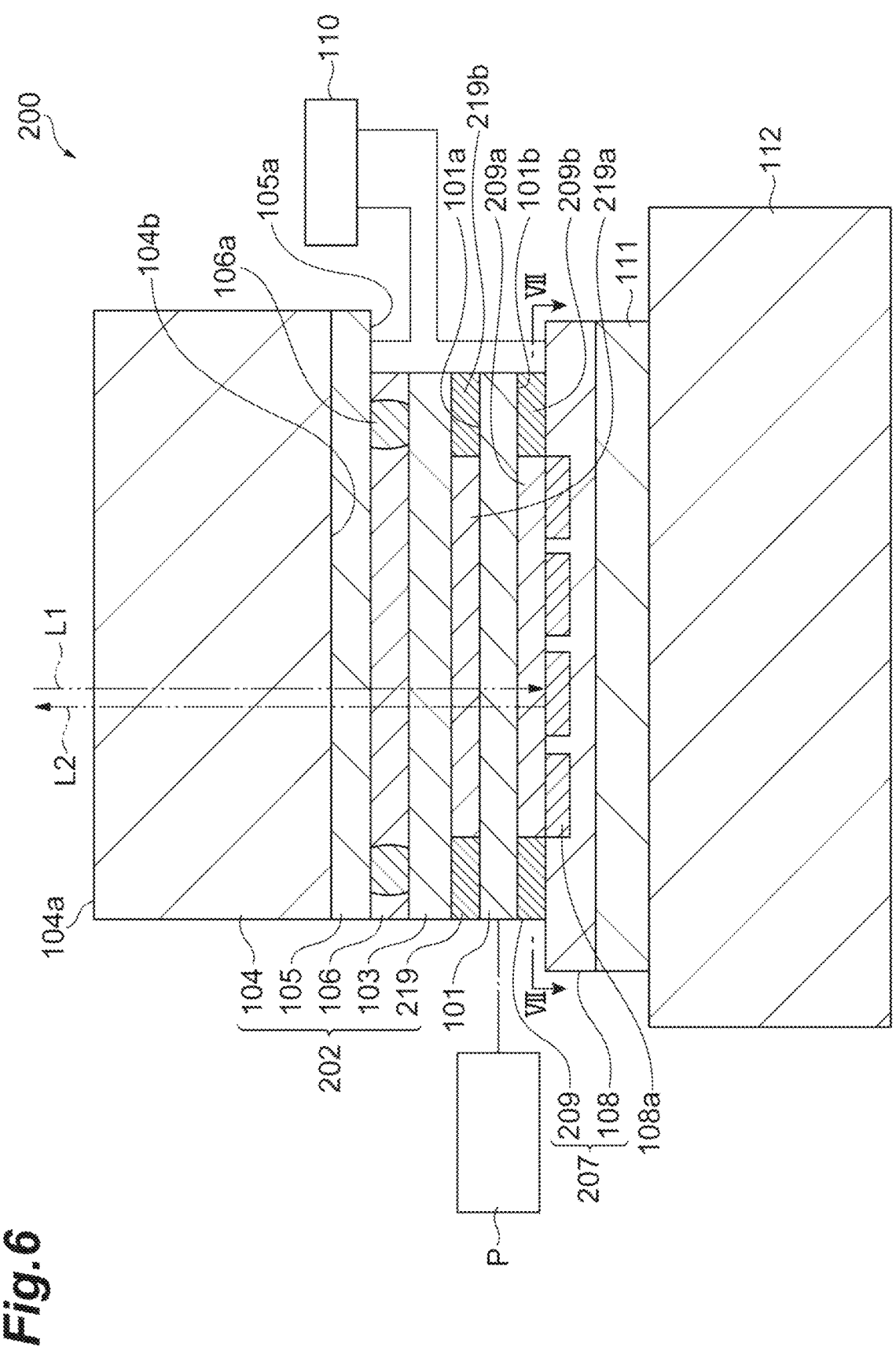
FIG. 6 is a cross-sectional view showing a spatial light modulator according to another embodiment.

FIG. 6 is a cross-sectional view showing the spatial light modulator 200 according to the present embodiment. As shown in FIG. 6, the reflective spatial light modulator 200 includes the electro-optic crystal 101, a light input/output unit 202, a light reflection unit 207, and the drive circuit 110.

The light input/output unit 202 has the first electrode 103, the transparent substrate 104, the transparent electrode 105, the adhesive layer 106, and an adhesive layer 219. The adhesive layer 219 is disposed between the first electrode 103 and the input surface 101a and bonds the first electrode 103 and the electro-optic crystal 101 to each other. The adhesive layer 219 of the present embodiment has a first region 219a forming the center thereof and a second region 219b surrounding an outer circumference of the first region 219a. The first region 219a can be formed of a material having a composition similar to that of the first region 119a. In addition, the second region 219b can be formed of a material having a composition similar to that of the second region 119b.

The light reflection unit 207 has the CMOS substrate 108 and an adhesive layer 209. The adhesive layer 209 has a first region 209a forming the center thereof and a second region 209b surrounding an outer circumference of the first region 209a. The configuration of the adhesive layer 209 is similar to that of the adhesive layer 219 described above. The first region 209a has a configuration similar to that of the first region 219a, and the second region 209b has a configuration similar to that of the second region 219b.

Figure 7:
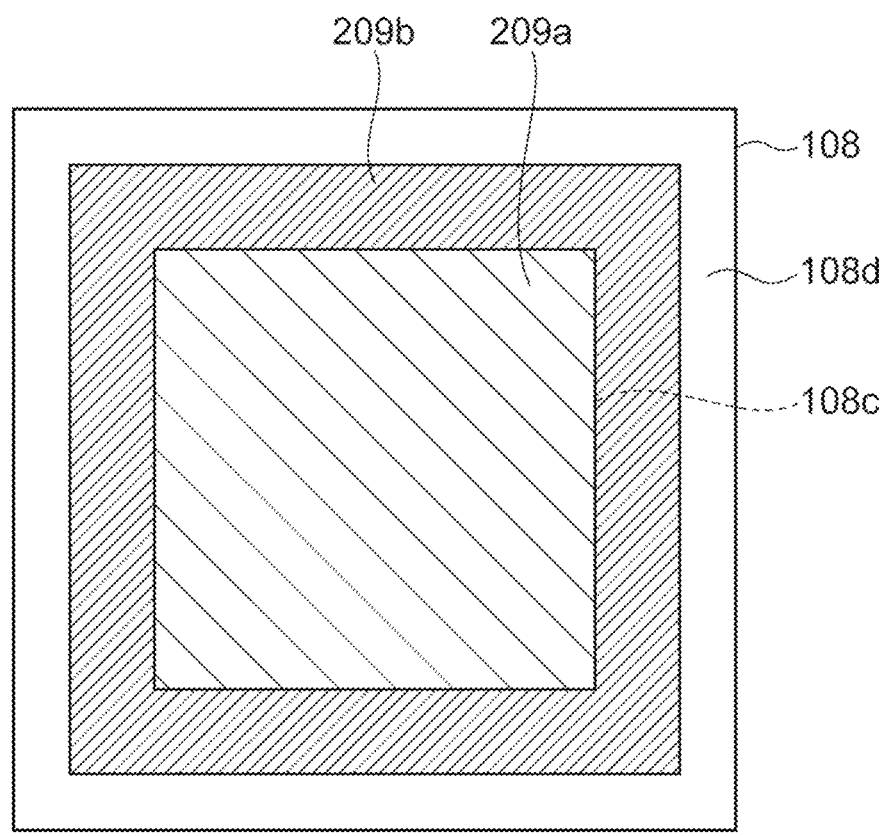
FIG. 7 is a cross-sectional view along VII-VII in FIG. 6.

Subsequently, a relationship between the adhesive layer 209, the adhesive layer 219, and the CMOS substrate 108 will be described. Since the adhesive layer 209 and the adhesive layer 219 exhibit configurations similar to each other, the adhesive layer 209 will be representatively described here. FIG. 7 is a cross-sectional view along VII-VII in FIG. 6. As shown in FIG. 7, the first region 209a of the adhesive layer 209 faces the pixel region 108c and exhibits a rectangular shape in a plan view. The second region 209b of the adhesive layer 209 surrounds the first region 209a and exhibits a rectangular frame shape in a plan view. A boundary between the first region 209a and the second region 209b coincides with the boundary between the pixel region 108c and the surrounding region 108d in a plan view. That is, as in FIG. 7, when viewed in the input direction of the input light L1, the first region 209a overlaps the pixel region 108c. For this reason, in FIG. 7, the hidden line indicating the pixel region 108c overlaps the boundary between the first region 209a and the second region 209b, and therefore it is not depicted. The second region 209b is disposed between the surrounding region 108d and the rear surface 101b of the electro-optic crystal 101.

In the present embodiment, since the area of the second region 109b in a plan view can be increased, the electro-optic crystal 101 and the CMOS substrate 108 can be more firmly bonded to each other. In addition, the electro-optic crystal 101 and the first electrode 103 can be more firmly bonded to each other.

Third Embodiment

Subsequently, a spatial light modulator 300 according to the present embodiment will be described. Points differing from the first embodiment will be mainly described. The same reference signs are applied to elements or members which are the same, and detailed description thereof will be omitted.

Figure 8:
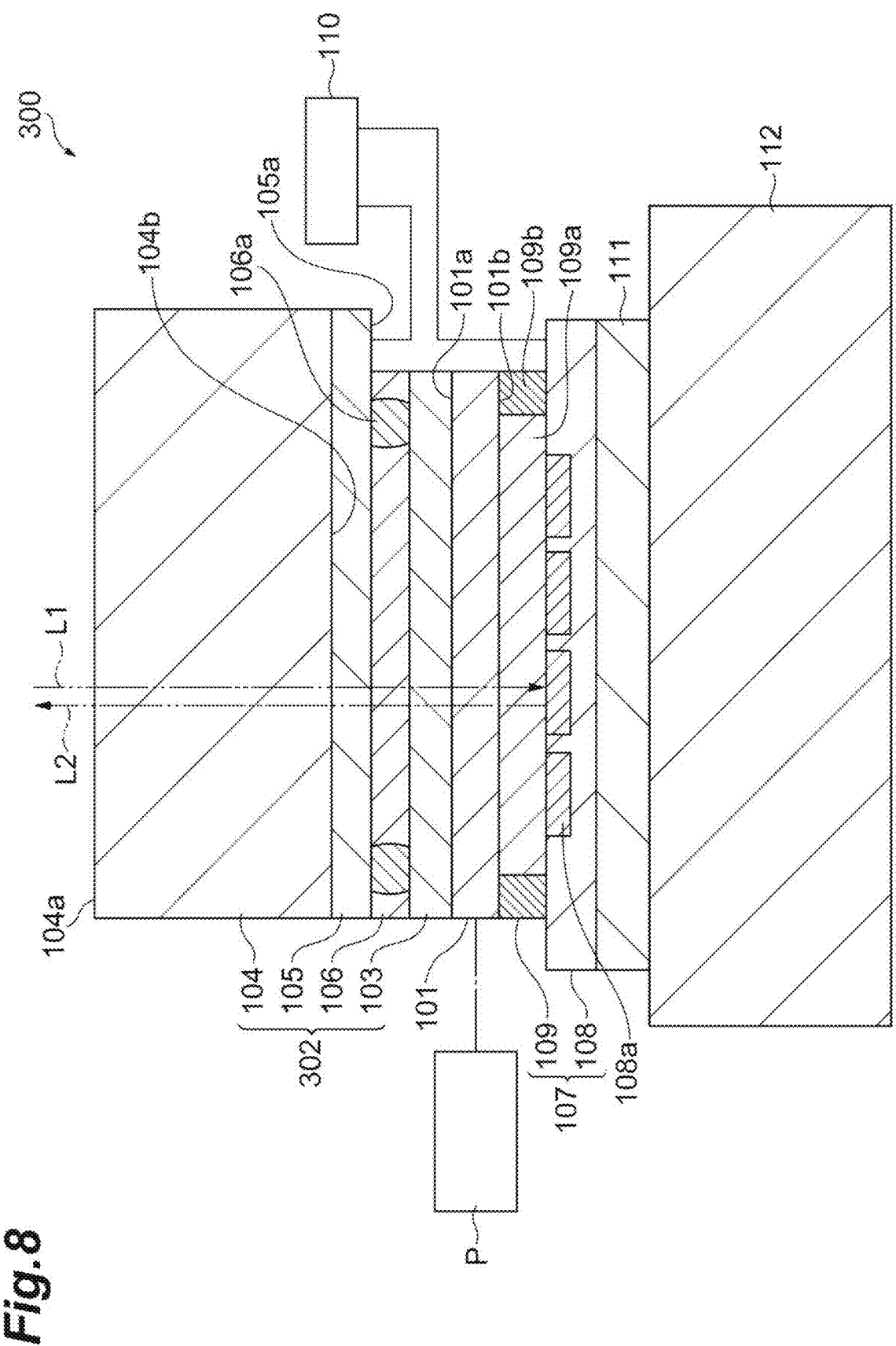
FIG. 8 is a cross-sectional view showing a spatial light modulator according to another embodiment.

FIG. 8 is a cross-sectional view showing the spatial light modulator 300 according to the present embodiment. As shown in FIG. 8, the reflective spatial light modulator 300 includes the electro-optic crystal 101, a light input/output unit 302, the light reflection unit 107, and the drive circuit 110. The CMOS substrate 108 constituting the light reflection unit 107 is fixed to the substrate 112.

The light input/output unit 302 has the first electrode 103, the transparent substrate 104, the transparent electrode 105, and the adhesive layer 106. The first electrode 103 is directly bonded to the input surface 101a of the electro-optic crystal 101 without the adhesive layer 119 therebetween. As an example, the first electrode 103 can be formed by performing vapor deposition of ITO on the input surface 101a of the electro-optic crystal 101.

In the present embodiment as well, mixing of electrical signals input to the plurality of second electrodes 108a due to the first region 109a in the adhesive layer 109 of the light reflection unit 107 is curbed. In addition, injection of charge into the electro-optic crystal 101 from the adhesive layer 109 is curbed. Therefore, the modulation accuracy can become stable. In addition, the second region 109b allows the CMOS substrate 108 to be fixed to the electro-optic crystal 101.

Fourth Embodiment

Subsequently, a spatial light modulator 400 according to the present embodiment will be described. Points differing from the first embodiment will be mainly described. The same reference signs are applied to elements or members which are the same, and detailed description thereof will be omitted.

Figure 9:
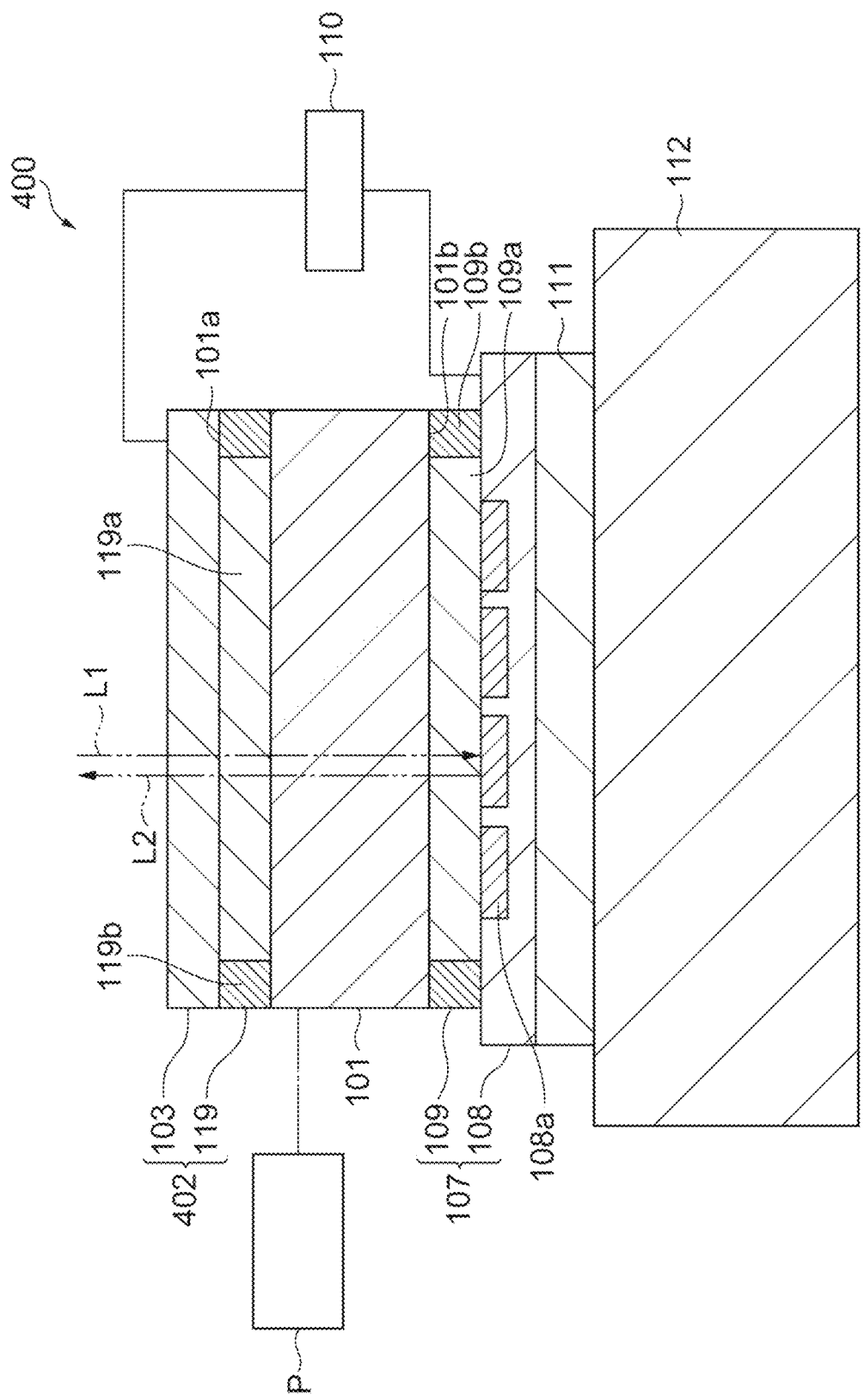
FIG. 9 is a cross-sectional view showing a spatial light modulator according to another embodiment.

FIG. 9 is a cross-sectional view showing the spatial light modulator 400 according to the present embodiment. As shown in FIG. 9, the reflective spatial light modulator 400 includes the electro-optic crystal 101, a light input/output unit 402, the light reflection unit 107, and the drive circuit 110. The CMOS substrate 108 constituting the light reflection unit 107 is fixed to the substrate 112.

The light input/output unit 402 is constituted of the first electrode 103 and the adhesive layer 119. That is, the light input/output unit 402 does not have the transparent substrate 104, the transparent electrode 105, and the adhesive layer 106. In the present embodiment, the drive circuit 110 is connected to the first electrode 103 and the CMOS substrate 108. As an example, the first electrode 103 can be formed by performing vapor deposition of ITO with respect to the cured adhesive layer 119 which is bonded to the input surface 101a of the electro-optic crystal 101. In this configuration, the adhesive layer 119 is disposed not for adhesion between the electro-optic crystal 101 and the first electrode 103 but to mainly curb injection of charge into the electro-optic crystal 101 from the first electrode 103. For this reason, the adhesive layer 119 shown in the example includes the first region 119a and the second region 119b. For example, the second region 119b may have a composition similar to the composition of the first region 119a.

Fifth Embodiment

Subsequently, a spatial light modulator 500 according to the present embodiment will be described. Points differing from the first embodiment will be mainly described. The same reference signs are applied to elements or members which are the same, and detailed description thereof will be omitted.

Figure 10:
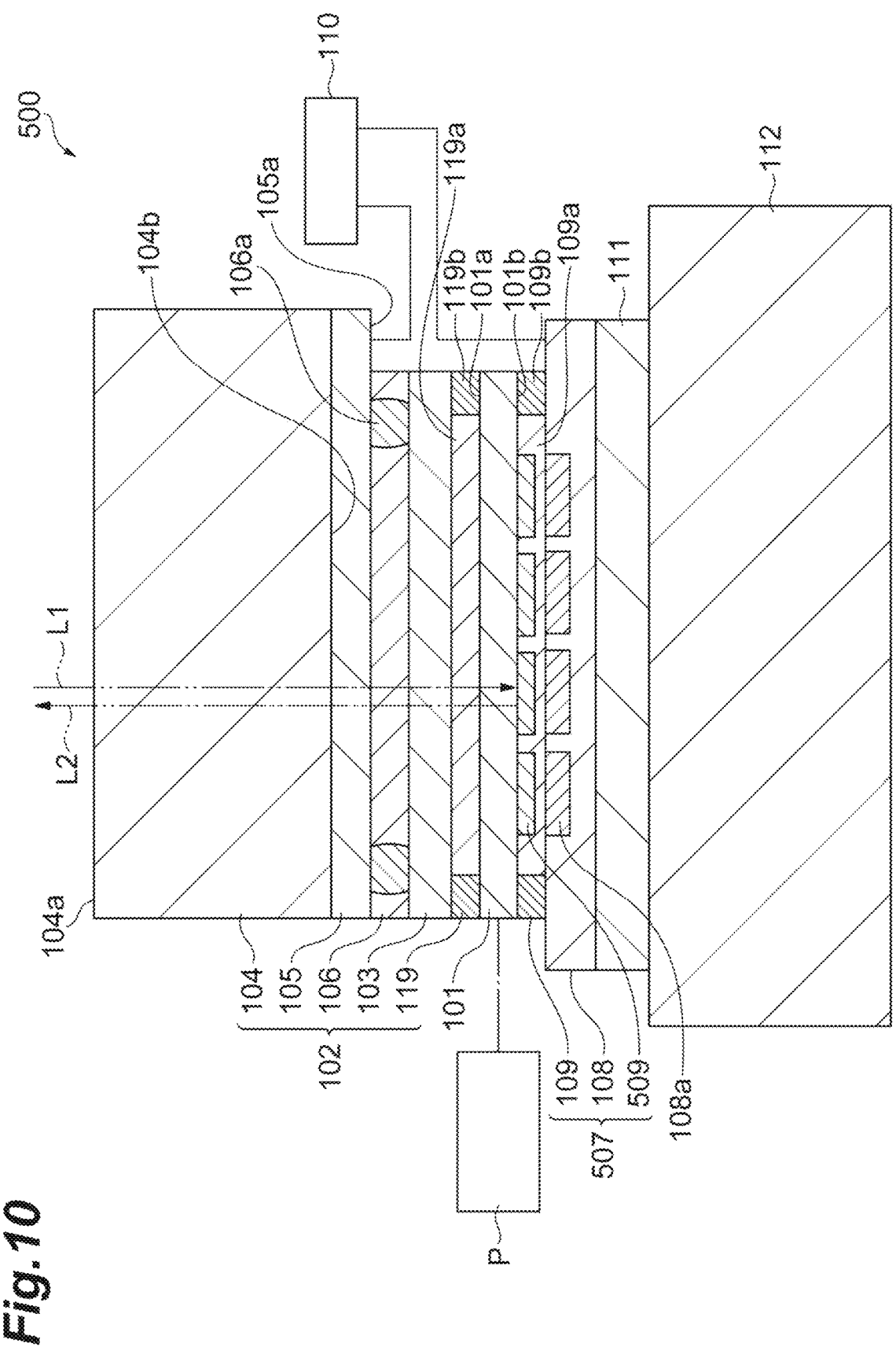
FIG. 10 is a cross-sectional view showing a spatial light modulator according to another embodiment.

FIG. 10 is a cross-sectional view showing the spatial light modulator 500 according to the present embodiment. As shown in FIG. 10, the reflective spatial light modulator 500 includes the electro-optic crystal 101, the light input/output unit 202, a light reflection unit 507, and the drive circuit 110.

The light reflection unit 507 includes the CMOS substrate 108, the adhesive layer 109, and auxiliary electrodes (third electrodes) 509. The CMOS substrate 108 is fixed to the substrate 112. A plurality of auxiliary electrodes 509 are disposed on the rear surface 101b of the electro-optic crystal 101. The auxiliary electrodes 509 functions as a mirror reflecting the input light L1 propagated inside the electro-optic crystal 101 toward the light input/output unit 102. For example, the auxiliary electrodes 509 are metal electrodes and can be formed of aluminum or the like. Similar to the second electrodes 108a formed on the CMOS substrate 108, the auxiliary electrodes 509 are disposed in a two-dimensional manner. That is, the auxiliary electrodes 509 and the second electrodes 108a face each other in one-to-one correspondence.

The plurality of auxiliary electrodes 509 are formed on the rear surface 101b side of the electro-optic crystal 101 in a manner of facing the plurality of second electrodes 108a. The auxiliary electrodes 509 are positioned in an electrostatic field formed by the first electrode 103 of the electro-optic crystal 101 on the input surface 101a side and the second electrodes 108a. For this reason, an electrostatic field is generated between the first electrode 103 and the auxiliary electrodes 509 and between the auxiliary electrodes 509 and the second electrodes 108a due to electrostatic induction. That is, the auxiliary electrodes 509 function as electrostatic lenses for preventing spreading of an electrical signal transferred as an electric line of force. Accordingly, in the adhesive layer 109 and the electro-optic crystal 101, spreading of an electrical signal (that is, an electric line of force) input from the drive circuit 110 can be curbed drastically.

Therefore, mixing of input electrical signals can be further curbed, and thus the modulation accuracy can become stable with higher resolution.

Hereinabove, the embodiments have been described in detail with reference to the drawings. However, specific configurations are not limited to these embodiments.

Figure 11:
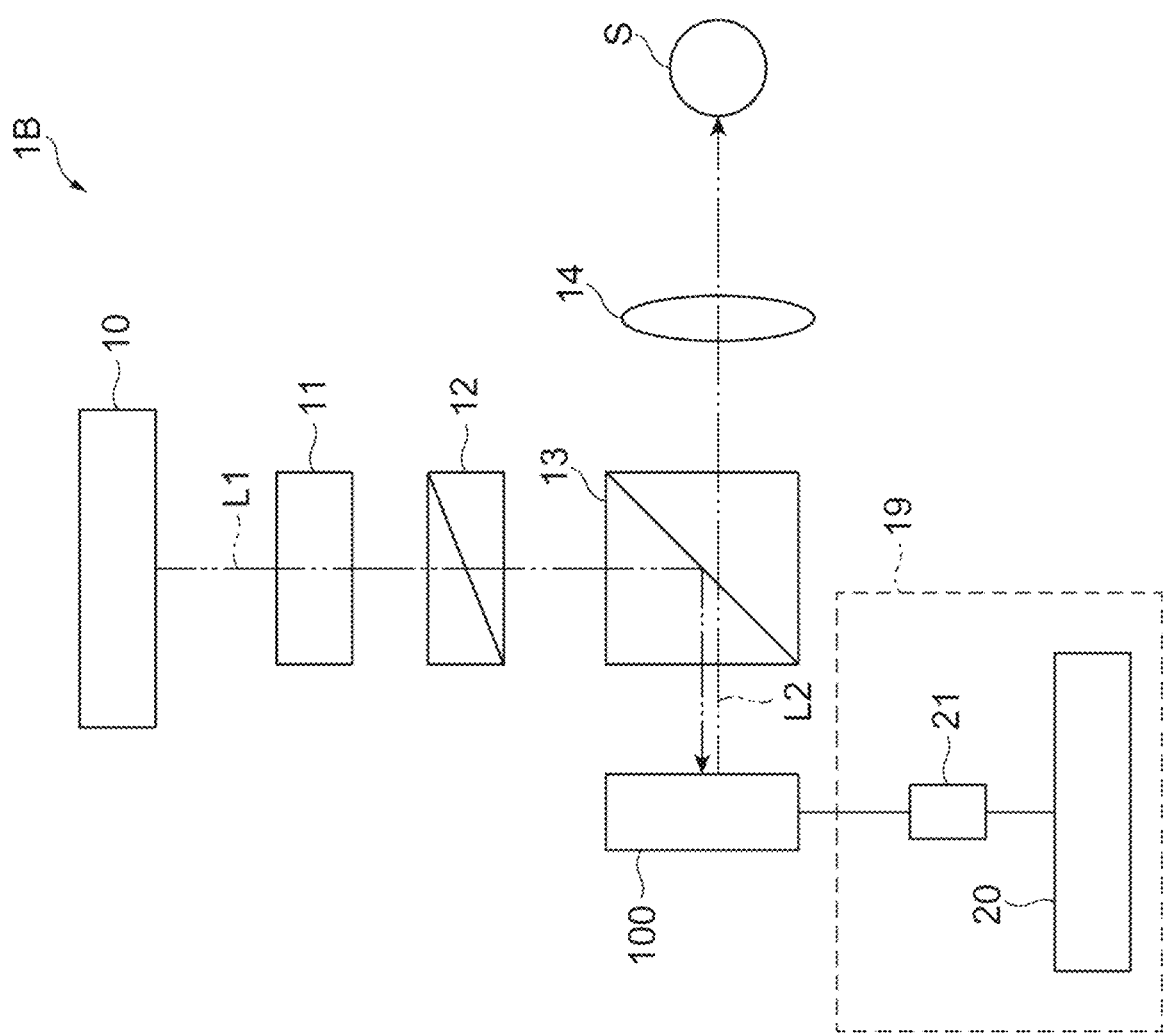
FIG. 11 is a block diagram showing a configuration of a light irradiation device according to the embodiment.

For example, in the foregoing embodiments, the optical observation device 1A including a spatial light modulator has been exemplified, but the embodiments are not limited thereto. For example, the spatial light modulator 100 may be mounted in a light irradiation device 1B. FIG. 11 is a block diagram showing a configuration of a light irradiation device. The light irradiation device 1B has the light source 10, the collimator lens 11, the polarization element 12, the polarization beam splitter 13, the spatial light modulator 100, the first optical system 14, and the control unit 19 including the computer 20 and the controller 21. In this configuration, the specimen S is irradiated with the modulation light L2 output from the spatial light modulator 100 by the first optical system 14. Using the spatial light modulator 100, 1) a position of an irradiation location can be limited, 2) the position of the irradiation location can be moved, 3) a plurality of irradiation locations can be formed at the same time, and 4) a phase of irradiation light can be controlled.

In addition, the fifth embodiment has shown a configuration in which the auxiliary electrodes 509 formed of a metal reflect the input light L1, but the embodiments are not limited thereto. For example, the auxiliary electrodes 509 may be transparent electrodes or may be formed of a transparent film such as ITO, for example. In this case, the input light L1 can be transmitted through the auxiliary electrodes and can be reflected by the second electrodes 108a.

In addition, the configurations of the foregoing embodiments can be diverted to each other unless there is any particular contradiction or problem. In the adhesive layer 109 and the adhesive layer 119 shown in the third embodiment to the fifth embodiment, the boundary between the first region and the second region is positioned on the side outward from the edge of the boundary between the pixel region 108c and the surrounding region 108d. For example, the adhesive layer 109 and the adhesive layer 119 may have a configuration in which the boundary between the first region and the second region coincides with the boundary between the pixel region 108c and the surrounding region 108d.

In addition, an example in which the first region 109a is formed on the whole surface of the first region has been described, but the embodiments are not limited thereto. For example, the first region 109a may be disposed in a two-dimensional manner corresponding to the second electrodes 108a.

REFERENCE SIGNS LIST

1A Optical observation device
1B Light irradiation device
100 Spatial light modulator (reflective spatial light modulator)
101 Electro-optic crystal
101a Input surface
101b Rear surface
102 Light input/output unit
103 First electrode
107 Light reflection portion
108 CMOS substrate (substrate)
108a Second electrode 109 Adhesive layer
110 Drive circuit
509 Auxiliary electrode (third electrode)
L1 Input light
L2 Modulation light

The invention claimed is:

1. A reflective spatial light modulator modulating input light and outputting modulated modulation light, the reflective spatial light modulator comprising:
   a perovskite-type electro-optic crystal having an input surface to which the input light is input and a rear surface opposing the input surface, and having a relative dielectric constant of 1,000 or higher;
   a light input/output unit being disposed on the input surface of the electro-optic crystal and having a first electrode through which the input light is transmitted;
   a light reflection unit including a substrate on which a plurality of second electrodes is disposed and an adhesive layer for fixing the substrate to the rear surface, being disposed on the rear surface of the electro-optic crystal, and reflecting the input light toward the light input/output unit; and
   a drive circuit applying an electric field between the first electrode and the plurality of second electrodes,
   wherein the substrate includes a pixel region in which the plurality of second electrodes is disposed, and a surrounding region surrounding the pixel region,
   wherein the adhesive layer includes a first region facing the pixel region, and a second region surrounding the first region,
   wherein the adhesive layer has a dielectric material in a cured product made of a non-conductive adhesive material, and
   wherein a content of the dielectric material in the second region is lower than a content of the dielectric material in the first region.

2. The reflective spatial light modulator according to claim 1,
   wherein a boundary between the first region and the second region is positioned on a side outward from an edge of a boundary between the pixel region and the surrounding region when viewed in an input direction of the input light.

3. The reflective spatial light modulator according to claim 1,
   wherein a boundary between the first region and the second region coincides with the boundary between the pixel region and the surrounding region when viewed in an input direction of the input light.

4. The reflective spatial light modulator according to claim 1,
   wherein the light input/output unit includes a different adhesive layer for fixing the first electrode to the input surface,
   wherein the different adhesive layer has a first region facing the pixel region and having a dielectric material in a cured product made of a non-conductive adhesive material, and a second region surrounding the first region, and
   wherein the content of the dielectric material in the second region of the different adhesive layer is lower than the content of the dielectric material in the first region of the different adhesive layer.

5. The reflective spatial light modulator according to claim 1,
   wherein the light input/output unit further includes a transparent substrate having a first surface to which the input light is input and a second surface serving as a surface on a side opposite to the first surface, and the first electrode is disposed on the second surface of the transparent substrate.

6. The reflective spatial light modulator according to claim 1,
   wherein when the relative dielectric constant of the electro-optic crystal is $\varepsilon_{xtl}$, a thickness of the electro-optic crystal from the input surface to the rear surface is $d_{xtl}$, a thickness of the adhesive layer is $d_{ad}$, and a ratio $V_{xtl}/V_{smax}$ of $V_{xtl}$ indicating a voltage applied to the electro-optic crystal in order to output the modulation light obtained by modulating a phase of input light by $2\pi$ radians to $V_{smax}$ indicating a maximum voltage of an application voltage generated by the drive circuit is $R_s$, a relative dielectric constant Cad of the adhesive layer including the dielectric material is indicated by Expression (1).

[Math. 1]

$$\varepsilon_{ad} > \left( \frac{\varepsilon_{xtl} \cdot R_s}{d_{xtl} \cdot (1 - R_s)} \right) \cdot d_{ad}. \quad (1)$$

7. The reflective spatial light modulator according to claim 1,
   wherein the first electrode is formed on a whole surface of the input surface.

8. The reflective spatial light modulator according to claim 1,
   wherein the light reflection unit further includes a plurality of third electrodes disposed on the rear surface of the electro-optic crystal in a manner of facing the plurality of second electrodes.

9. The reflective spatial light modulator according to claim 8,
   wherein in the light reflection unit, the input light is reflected by the plurality of third electrodes.

10. The reflective spatial light modulator according to claim 1,
    wherein in the light reflection unit, the input light is reflected by the plurality of second electrodes.

11. The reflective spatial light modulator according to claim 1,
    wherein the electro-optic crystal is a $KTa_{1-x}Nb_xO_3$ ($0 \leq x \leq 1$, KTN) crystal, a $K_{1-y}Li_yTa_{1-x}Nb_xO_3$ ($0 \leq x \leq 1$ and $0 < y < 1$, KLTN) crystal, or a PLZT crystal.

12. The reflective spatial light modulator according to claim 1, further comprising:
    a temperature control element for controlling a temperature of the electro-optic crystal.

13. An optical observation device comprising:
    a light source outputting the input light;
    the reflective spatial light modulator according to claim 1;
    an optical system irradiating a target with modulation light output from the reflective spatial light modulator; and
    a photodetector detecting light output from the target.

14. A light irradiation device comprising:
    a light source outputting the input light;
    the reflective spatial light modulator according to claim 1; and
    an optical system irradiating a target with modulation light output from the reflective spatial light modulator.

* * * * *